(12) United States Patent
Christensen et al.

(10) Patent No.: US 6,945,160 B2
(45) Date of Patent: Sep. 20, 2005

(54) OUTDOOR COOKER AND SMOKER APPARATUS

(75) Inventors: David M. Christensen, O'Fallon, IL (US); Bernard A. Lauzon, Freeburg, IL (US); Daniel J. Sovar, Florissant, MO (US); John A. Schweiss, Belleville, IL (US)

(73) Assignee: Empire Comfort Systems, Inc., Belleville, IL (US)

(*) Notice: Subject to any disclaimer, the term of this patent is extended or adjusted under 35 U.S.C. 154(b) by 308 days.

(21) Appl. No.: 10/294,264

(22) Filed: Nov. 14, 2002

(65) Prior Publication Data

US 2004/0094142 A1 May 20, 2004

(51) Int. Cl.[7] ............................................. A47J 37/00
(52) U.S. Cl. ...................... 99/447; 99/401; 126/25 R
(58) Field of Search ........................ 99/447, 446, 400, 99/401, 482, 481; 126/25 R, 9 R, 25 C, 41 R, 59.5

(56) References Cited

U.S. PATENT DOCUMENTS

| | | | |
|---|---|---|---|
| 2,985,097 A | 5/1961 | Nevin et al. | |
| 4,279,240 A | * 7/1981 | Artusy | ........................ 126/579 |
| 4,355,570 A | 10/1982 | Martin et al. | |
| 4,750,469 A | 6/1988 | Biggs | |
| 4,773,319 A | 9/1988 | Holland | |
| 4,909,137 A | 3/1990 | Brugnoli | |
| 5,313,877 A | 5/1994 | Holland | |
| 5,529,798 A | 6/1996 | Clark et al. | |
| 5,890,422 A | 4/1999 | Clark et al. | |

* cited by examiner

Primary Examiner—Reginald L. Alexander
(74) Attorney, Agent, or Firm—Thompson Coburn LLP

(57) ABSTRACT

A cooker and smoker apparatus for an outdoor grill is comprised of a plurality of louvers that are pivoted between a first position where the louvers overlap each other and a second position where the louvers are oriented uprightly relative to each other for the respective indirect and direct cooking of food supported on a cooking grate of the outdoor grill. The cooker and smoker apparatus provides for smoking of the cooking food in both modes of operation. Additionally, the cooker and smoker apparatus is provided with a simplified construction that reduces the cost of its manufacturing and enables the apparatus to be a part of an outdoor grill as it is manufactured or to be retrofit to an existing outdoor grill.

25 Claims, 11 Drawing Sheets

OUTDOOR COOKER AND SMOKER APPARATUS

BACKGROUND OF THE INVENTION (1) Field of the Invention

The present invention pertains to an outdoor cooker and smoker apparatus for an outdoor grill that cooks food by providing direct or indirect heat from a heat source of the grill to the food, and when providing indirect heat the apparatus also burns off drippings from the food creating smoke that smokes the food in the grill. In particular, the present invention pertains to an apparatus for an outdoor grill that has a gas or charcoal heat source, where the apparatus provides direct and indirect heat to the food supported on a cooking surface of the grill by operation of a louver assembly. The louver assembly is comprised of a manual actuator and a plurality of louvers positioned beneath the grill cooking surface. Movement of the actuator moves the plurality of louvers between first and second positions. In the first positions the louvers are generally horizontal and provide indirect heating of the food. The horizontal louvers also catch drippings from the food and burn off the drippings creating smoke that smokes the food. In the second positions the louvers are generally vertical and provide direct heating of the food on the grill cooking surface.

(2) Description of the Related Art

The typical outdoor grill or barbecue is basically comprised of a base that encloses a source of heat, a cooking grate or grill cooking surface and a cover that protects the interior components of the outdoor grill when not in use and can optionally be used in cooking. In outdoor grills, the common sources of heat include charcoal bricks or briquettes and gas heat.

A disadvantage encountered in using outdoor grills that employ either charcoal or gas as a heat source is adjusting the heat of the source to achieve the desired cooking heat for particular foods. The cooking heat of charcoal grills can be adjusted by adjusting the amount of charcoal used as fuel and, in some cookers, adjusting the opening of air vents in the base of the cooker. The cooking heat of gas grills can be adjusted by adjusting the flow of gas to the grill.

In both types of grills, the food can be cooked with the cover removed from the base to allow the heat source to sear or quickly cook the food on the cooking grate on one side before turning or flipping the food to allow searing or quickly cooking the food on its opposite side. Alternatively, the food can be cooked with the cover in place on the grill where the heat source of the grill will quickly cook the surface of the food resting on the grill cooking grate and will gradually bake or cook by convection the opposite surface of the food. However, in both situations of cooking with or without the cover of the grill in place, the bottom surface of the food resting on the cooking grate is subjected to the direct heat of the heat source and cooks quickly, and in many situations cooks at a faster rate than desirable.

Some outdoor grills have been developed that include drip pans that can be inserted between the source of heat and the cooking grate when it is desired to cook food by indirect heat. The drip pan can be removed from between the source of heat and the grill cooking grate when it is desirable to cook food with direct heat. However, drip pans are disadvantaged in that when they are used to cook the food by indirect heat they also catch the food drippings. The drippings would otherwise fall through the grill cooking grate and burn on the charcoal briquettes or the bricks of the gas heat source producing smoke in the outdoor grill that smokes the cooking food and adds to its flavor. The prior art drip pans have typically been designed to channel or direct the food drippings off of the drip pan and toward a drain that drains the food drippings away from the grill cooking grate. Examples of these prior art drip pans are disclosed in the U.S. patents of Clark, et al., U.S. Pat. Nos. 5,529,798 and 5,890,422.

In addition, some grills have been designed with an elaborate system of shutters or vanes that are component parts of the interior of the outdoor grill and are moved between opened positions where they allow direct heat to the grill cooking grate and closed positions where they provide indirect heat to the grill cooking grate. Examples of these are also disclosed in the previously referenced U.S. Patents of Clark, et al. and in the U.S. Patent of Biggs, U.S. Pat. No. 4,750,469. However, the elaborate constructions of these heat controlling mechanisms contributes significantly to the overall cost of manufacturing the outdoor grill and to the complexity or difficulty in assembling the component parts of the grill.

SUMMARY OF THE INVENTION

What is needed to overcome the disadvantages associated with prior art outdoor grills is an apparatus that can be easily assembled to a grill without significantly increasing the cost of manufacturing the grill and can be easily operated to enable the grill to be used in both the direct and indirect cooking of food. In addition, the apparatus should still provide for the burning off of food drippings when used in indirect cooking to produce the smoke desired in the outdoor grill that smokes the food as it cooks and adds to its flavor. The above set forth objectives are achieved by the construction of the outdoor cooker and smoker apparatus of the present invention.

The outdoor cooker and smoker apparatus of the invention may be employed as a separate unit that is assembled to an existing outdoor grill, or could be a component part of a manufactured outdoor grill. Much of the construction of the outdoor grill with which the cooker and smoker apparatus of the invention is used is typical of outdoor grills.

The outdoor grill has a box shaped configuration and a gas burner as its heat source, although the novel features of the cooker and smoker apparatus are equally well suited for use in a grill having a rounded configuration and employing charcoal or other burning fuel as its heat source. The grill includes a base having a rectangular bottom wall and four side walls that extend upwardly from the edges of the bottom wall. The interior volume or the base accommodates a gas burner that is adjusted by manual controls that regulate the supply of gas to the burner to adjust the burner flame. A grill cooking grate is supported on the base side walls above the burner. A cover is removably positioned on top of the base covering the grill cooking grate and enclosing the interior volume of the base. The cover may be completely removable from the base or can be hinged to the back side wall of the base.

The cooker and smoker apparatus of the invention that enables direct and indirect cooking of food by the outdoor grill while smoking the food in both cooking modes is provided inside the base interior below the grill cooking grate and above the gas burner. The apparatus is basically comprised of a plurality of louvers and a manual actuator that controls movement of the louvers.

Each of the louvers is substantially identical to the others and each has a planar, rectangular configuration with a longitudinal length between opposite the first and second ends of the louvers. Each louver has a lateral width between first and second parallel, longitudinal edges of the louver. First and second pivot axles project from the respective first and second ends of the louver. An actuator tab projects from the first end of the louver laterally adjacent the first pivot axle. Each of the louvers, its first and second pivot axles and its actuator tab are formed from a single, unitary sheet of metal, preferably stainless steel. In addition, a plurality of bends are formed in each louver extending along its longitudinal length. One of these bends intersects the first and second pivot axles. Another of the bends intersects the actuator tab. The bends reinforce and strengthen the length of the louver as well as the first and second pivot axles and the actuator tab.

The plurality of louvers are mounted for pivoting movement of the louvers between first and second positions in the interior of the outdoor cooker base. The louvers are supported by their pivot axles on first and second end supports at the longitudinally opposite ends of the base. The plurality of louvers are suspended by their pivot axles so that they hang in the first, vertical or uprightly oriented positions. The first positions of the plurality of louvers is employed when direct heat cooking is desired. The louvers are pivotable by an actuator to the second positions of the louvers where they are positioned generally horizontally relative to each other. The second positions of the plurality of louvers is employed when indirect heat cooking of food is desired and where the burning and producing of smoke from food drippings to smoke the food is desired.

Where the cooker and smoker apparatus is a separate component part that can be assembled into the interior of the outdoor grill, the first and second end supports are mounted to the interior of the outdoor grill. The end supports could be supported on an inwardly projecting ledge surface of the outdoor grill or could be attached to the interior of the outdoor grill by separate fasteners.

Front and back supports extend longitudinally along the lengths of the plurality of louvers at laterally opposite sides of the louvers. The front and back supports have longitudinally opposite ends that are attached to the first and second end supports forming a rectangular frame that supports the plurality of louvers. The front and back supports could also be supported on an interior ledge surface of the outdoor grill or could be attached to the interior surface of the outdoor grill by separate fasteners.

An actuator bar extends laterally adjacent the first ends of the plurality of louvers and is connected to each of the actuator tabs of the louvers. The actuator bar, like each of the louvers, is formed from a planar piece of metal, preferably stainless steel. A plurality of holes are formed in the actuator bar and are spatially arranged along its lateral length. Each of the actuator tabs of the plurality of louvers is inserted into one of the actuator bar holes, thereby operatively connecting the actuator bar with the plurality of louvers. On lateral movement of the actuator bar, the louvers are caused to pivot between their first and second positions.

An actuator rod is operatively connected to the actuator bar for controlling the lateral movement of the actuator bar. The actuator rod extends from the actuator bar through a hole in a front wall of the grill base to a handle at a distal end of the rod positioned outside the grill. The actuator rod has a bend forming an offset in an intermediate portion of the rod. Manual manipulation of the handle moves the actuator bar which in turn pivots the plurality of louvers.

In operation of the outdoor cooker and smoker apparatus, by pushing the handle on the actuator rod toward the front wall of the grill the rod manipulates the actuator bar which in turn causes the plurality of louvers to pivot to their first, generally horizontal positions. In the horizontal positions the plurality of louvers cover the heat source for the indirect cooking of food on the grill cooking surface. In addition, food drippings that drip from the food as it cooks land on the horizontally positioned louvers and burn off from the heat of the heat source. This produces smoke in the interior of the outdoor grill that smokes the food as it cooks. Pulling the handle on the actuator rod away from the grill front wall causes the actuator bar inside the grill to pivot the louvers toward their second, upright oriented positions. The offset in the actuator rod comes into engagement against the exterior surface of the grill front wall and thereby holds the plurality of louvers in their upright orientations. In the upright orientations of the louvers, food cooked on the grill cooking surface is exposed to the direct heat of the heat source of the grill.

The plurality of louvers and their actuator described above provide an inexpensively manufactured and easily assembled and operated apparatus that enables outdoor grills to operate with direct or indirect heating of food and also enables smoking of the food that is being cooked by indirect heat. The simplified construction of the plurality of louvers and their actuators can easily be incorporated into an outdoor grill during its manufacturing and can also be easily retrofit to an existing outdoor grill.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
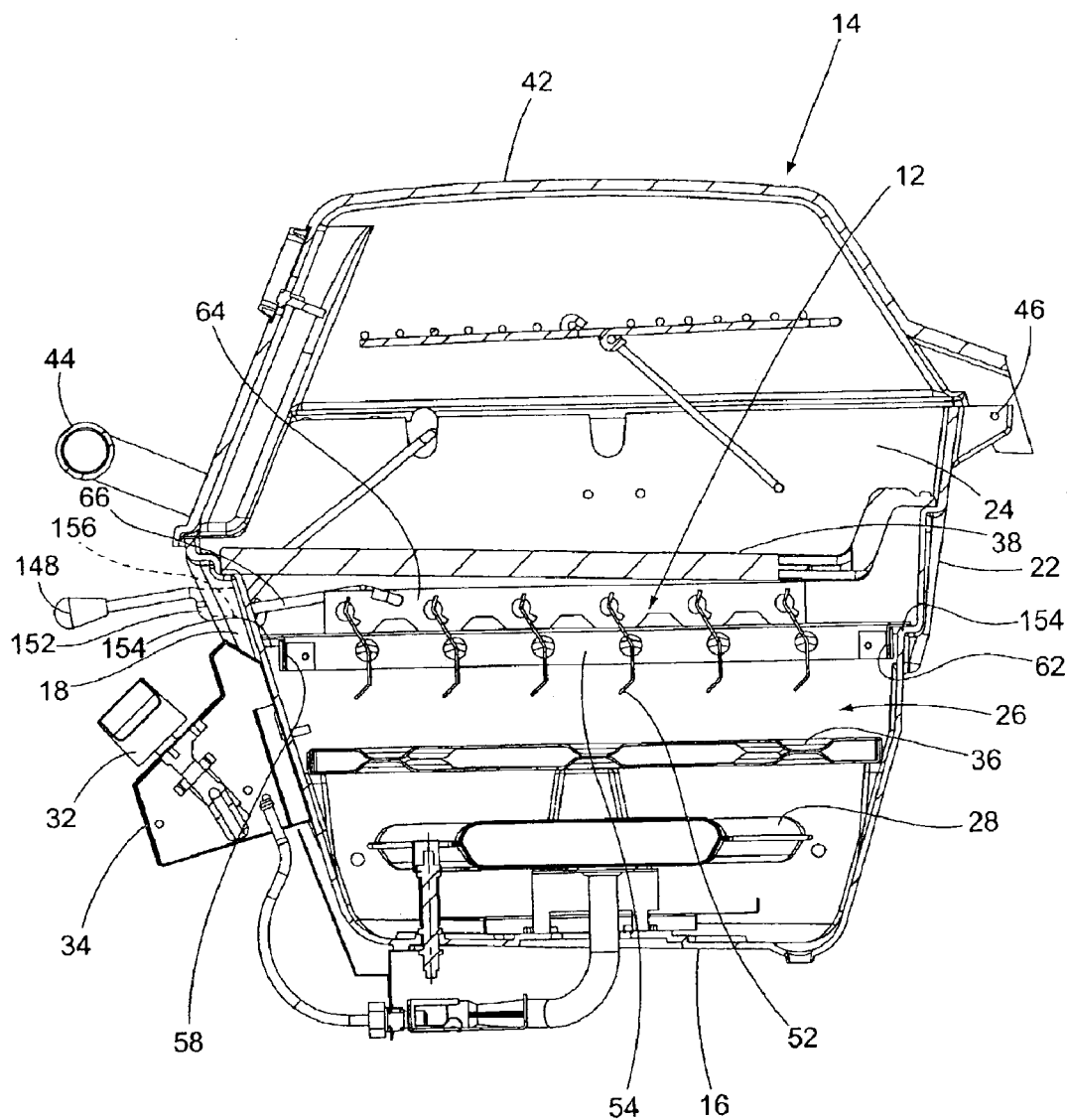
FIG. 1 is a side sectioned view of an outdoor grill employing the outdoor cooker and smoker apparatus of the invention.
Figure 2:
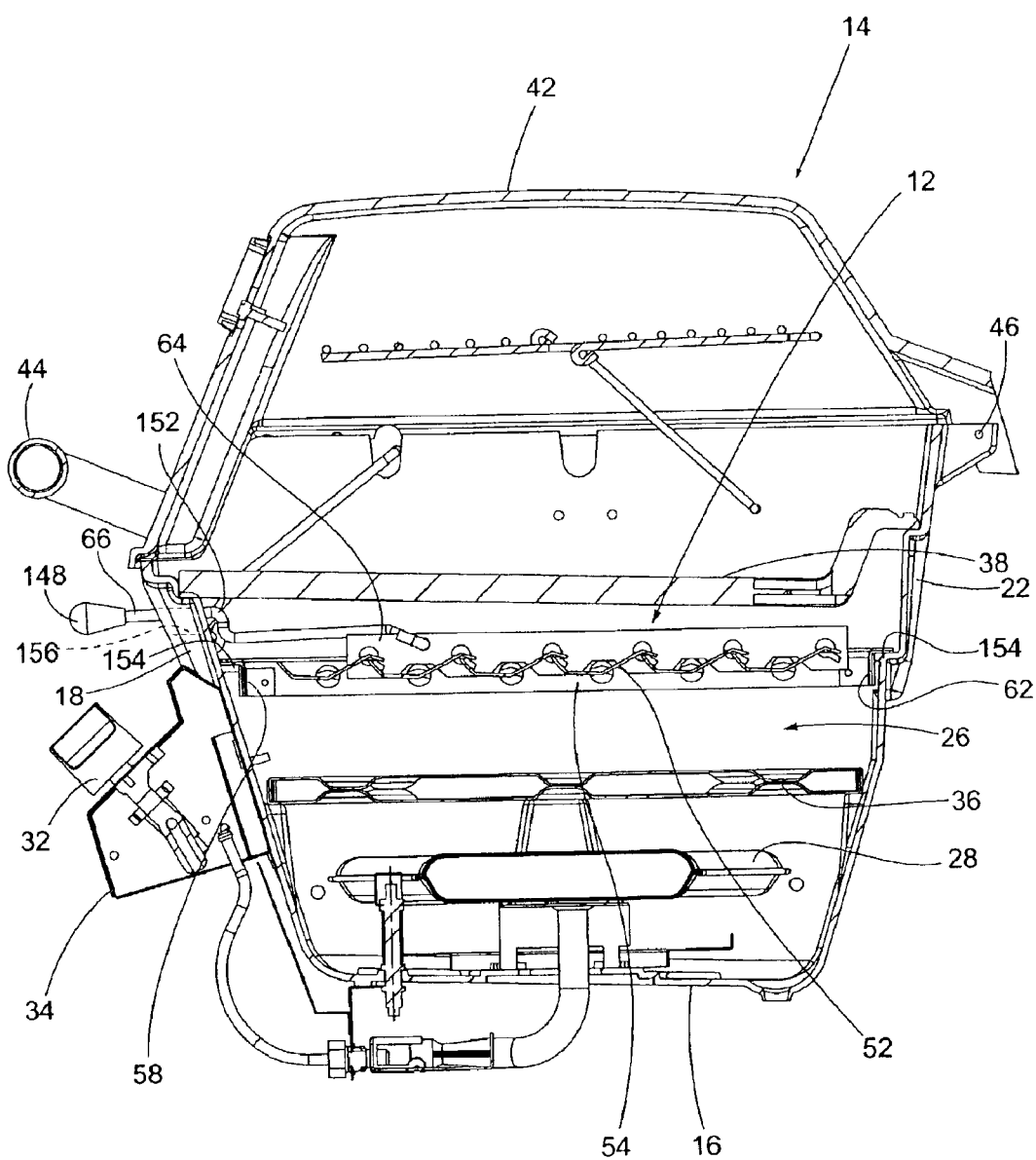
FIG. 2 is a view similar to that of FIG. 1, but showing the apparatus of the invention in a second mode of its use.

The outdoor cooker and smoker apparatus 12 of the present invention is shown in FIGS. 1 and 2 assembled inside an outdoor grill 14. The outdoor grill 14 shown in FIGS. 1 and 2 is only one example of the various different types of outdoor grills available with which the cooker and smoker apparatus 12 of the invention may be employed. Therefore, the outdoor grill 14 is only described generally herein. Referring to FIGS. 1 and 2, the outdoor grill 14 has a general box shaped configuration that is common to many outdoor grills of the prior art. Although the apparatus of the invention will be described using the box shaped outdoor grill 14 as an illustrative environment, it should be understood that the cooker and smoker apparatus 12 of the invention can be modified for its use in outdoor grills of other shapes, for example outdoor grills having circular or rounded configurations.

The outdoor grill 14 is basically comprised of a base having a generally rectangular bottom wall 16 and four side walls that extend upwardly from the periphery of the base bottom wall. The four side walls include a front wall 18, a rear wall 22 and a pair of left and right side walls 24, only one of which is shown in FIGS. 1 and 2. The base bottom wall 16 and the four side walls 18, 22, 24 surround and contain an interior volume 26 of the grill that is dimensioned to accommodate a source of heat for the grill.

The source of heat may be burning fuel such as charcoal bricks or briquettes, or may be a gas burner. For illustrative purposes, the source of heat shown in drawing FIGS. 1 and 2 is a gas burner 28. Gas applied to the burner 28 is controlled by manual controls 32 that adjust gas supplying valves (not shown) mounted in a control counsel 34 on the front wall 18 of the base.

FIGS. 1 and 2 also disclose a heat diffuser plate 36 positioned in the grill interior volume 26 just above the gas burner heat source 28. The diffuser 36 is known in the art and functions to disburse the heat of the burner 28 while also preventing juices from cooking food from dripping directly onto the burner 28 and producing flare ups of flames that could potentially burn the food being cooked by the grill.

A grill cooking grate or cooking surface 38 is shown in FIGS. 1 and 2. The grate 38 is supported by the interior surfaces of the grill side walls above the diffuser 36 and the gas burner 28. The grill cooking grate 38 could be a single rectangular grate that extends across the interior volume 26 of the grill base, or could be several different grate sections that can be adjustably positioned in the interior volume 26 of the grill.

The grill has a top cover 42 with a manual handle 44. The cover is connected to the grill back wall 22 by a hinge 46.

The construction of the outdoor grill 14 described to this point is, for the most part, conventional. Added to the grill 14 is the cooker and smoker apparatus 12 of the invention that enables direct and indirect cooking of food by the grill, and enables smoking of food cooked in the indirect mode by catching and burning off the drippings of the cooking food. The apparatus of the invention may be made a part of the grill described above with only minor additions to the grill construction, and therefore the apparatus of the invention can be easily added to an existing construction of an outdoor grill without significantly increasing it's cost of manufacturing. Additionally, because the apparatus of the invention is so easily adapted to the typical construction of an outdoor grill, the apparatus of the invention can also be provided as a separate kit that is retrofit to an existing grill to enable it to perform the direct and indirect cooking of food while also smoking the food when cooked in the indirect mode.

Figure 3:
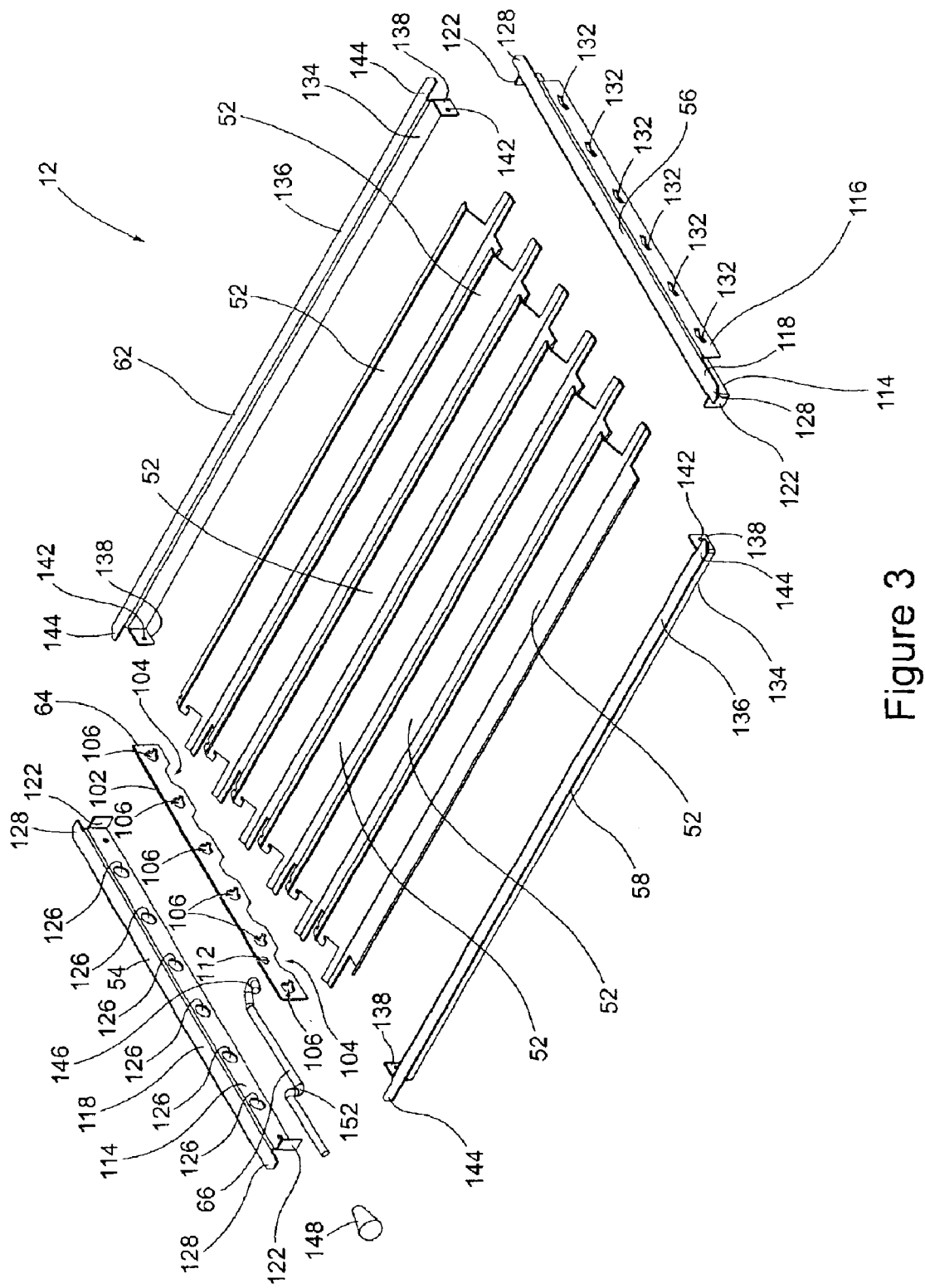
FIG. 3 is an exploded view of the component parts of the apparatus of the invention.

The cooker and smoker apparatus 12 of the present invention is shown in FIG. 3 with it's component parts disassembled. In the preferred embodiment of the invention the component parts of the apparatus 12 are constructed of stainless steel. Stainless steel is preferred over other metals because stainless steel will hold up better when subjected to the repeated heating and cooling cycles the apparatus would be subjected to in it's lifetime. In order to reduce the cost of constructing each of the component parts of stainless steel, each of the parts is stamped from a thin sheet of stainless steel and a majority of the parts are then formed with bends extending along their lengths in order to strengthen the parts and compensate for the reduced thickness of the parts.

The cooker and smoker apparatus 12 of the invention is basically comprised a plurality of louvers that are supported in a frame comprised of a first, left end support 54, a second, right end support 56, a front support 58 and a rear support 62, and an actuator mechanism comprised of an actuator bar 64 and an actuator rod 66. Each of the louvers 52 has the same construction, the left end support 54 and the right end support 56 have the same construction, and the front support 58 and the rear support 62 have the same construction which further reduces the manufacturing costs of the cooker and smoker apparatus 12 of the invention.

As stated earlier, the construction of each of the louvers 52 is the same. Although the construction of only one of the louvers 52 shown in FIGS. 4 and 5 will be described, it should be understood that each of the louvers has the same construction. The louver 52 has a planar, rectangular configuration with a longitudinal length between the opposite first 72 and second 74 ends of the louver. Each louver 52 has a lateral width across it's longitudinal length between first 76 and second 78 parallel edges of the louver.

The louver 52 is formed with first 82 and second 84 pivot axles projecting longitudinally outwardly from the respective first 72 and second 74 ends of louver. The pivot axles 82, 84 are longitudinally aligned with each other and are positioned on the louver in off-center positions relative to the lateral width of the louver. The pivot axles 82, 84 are positioned slightly laterally closer to the first longitudinal edge 76 of the louver than the second longitudinal edge 78 of the louver.

An actuator tab 86 projects longitudinally outwardly from the first end 72 of the louver. The actuator tab 86 is laterally adjacent the second longitudinal edge 78 of the louver. The actuator tab 86 is formed with a neck portion 88 having a lateral width and a head portion 92 having a lateral width that is larger than the width of the neck portion. The actuator tab 86 has a longitudinal length that is not as great as the longitudinal length of the first pivot axel 82. The louver 52, the first pivot axel 82, the second pivot axle 184 and the actuator tab 86 are all integrally formed by being stamped together from a single sheet of metal, preferably stainless steel, thereby reducing manufacturing costs.

Figure 4:
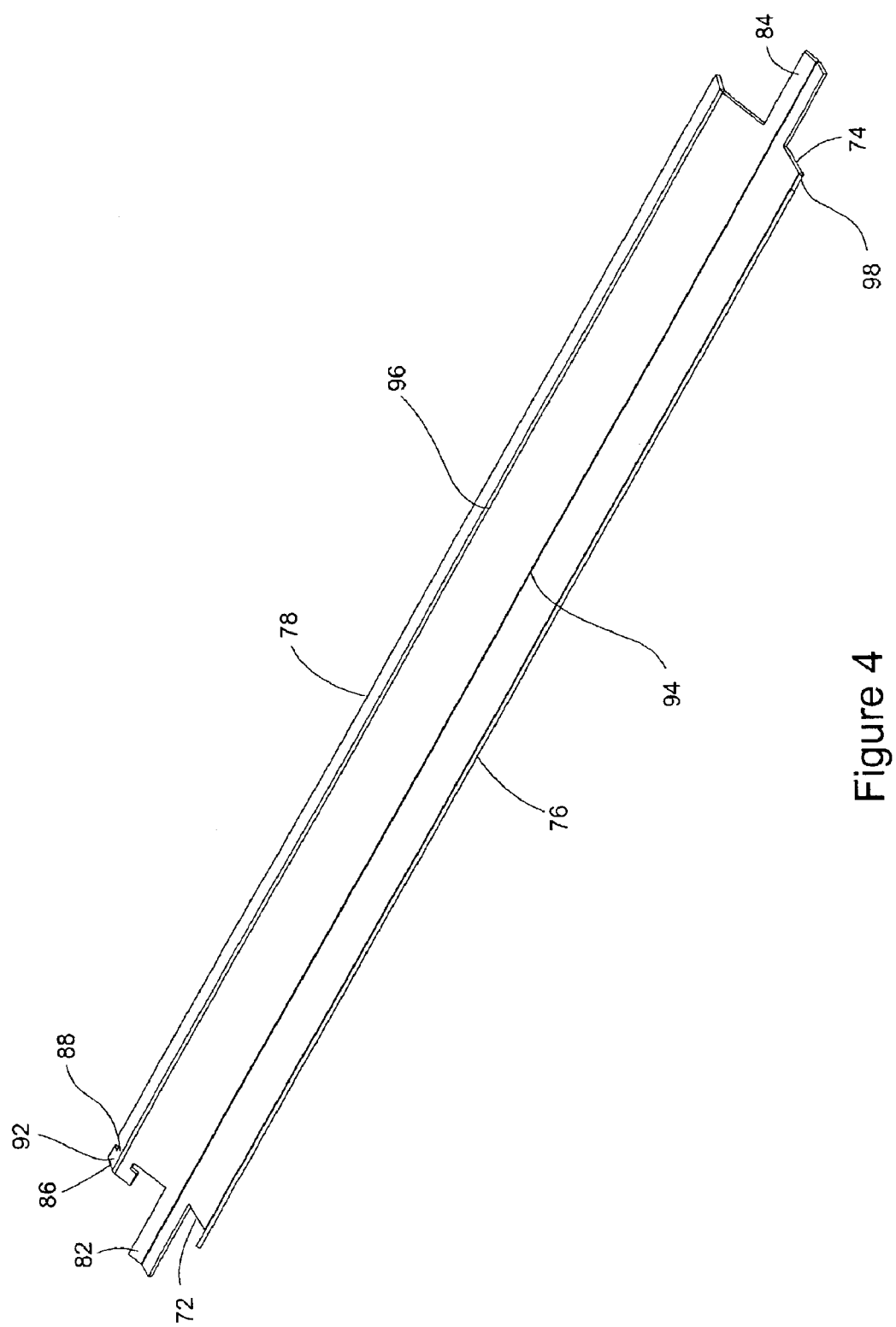
FIG. 4 is a perspective view of one of the louvers of the apparatus of the invention.
Figure 5:
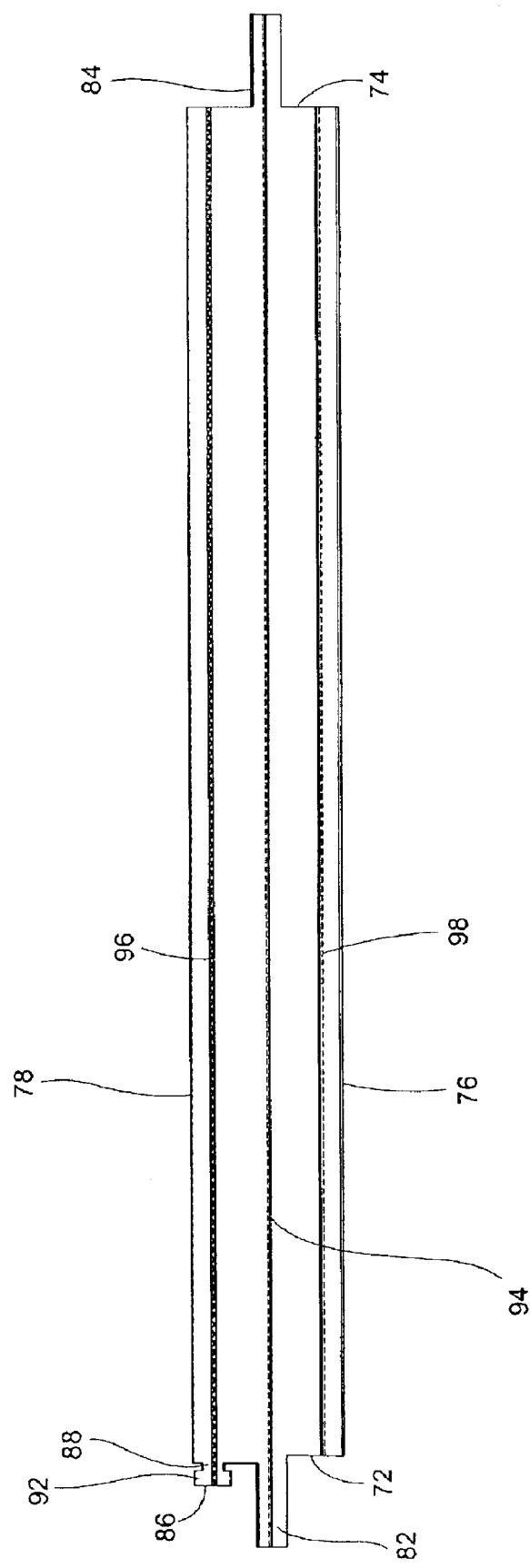
FIG. 5 is a plan view of the louver of FIG. 4.

A plurality of bends are formed along the longitudinal length of the louver to strengthen the louver and enable it's being formed from a metal sheet of reduced thickness, thereby further decreasing manufacturing costs. The bends include a first straight line bend 94 formed in the longitudinal length of the louver 52 through the middle of the first pivot axle 82 and the second pivot axle 84. The first bend 94 gives the first and second pivot axles 82, 84 a v-shaped cross section. This first bend 94 extending through the axels 82, 84 and across the length of the louver 52 reinforces the axels 82, 84 against bending as well as reinforcing the longitudinal length of the louver against bending. A second straight line bend 96 is formed along the longitudinal length of the louver 52 parallel with the first straight line bend 94 and intersecting the middle of the actuator tab 86. The second bend 96 gives the actuator tab 86 a v-shaped cross section. This second straight line bend 96 strengthens the actuator tab 86 against bending as well as further strengthens the longitudinal length of the louver 52 against bending. A third straight line bend 98 extends across the longitudinal length of the louver 52 positioned laterally between the first straight line bend 94 and the first longitudinal edge 76 of the louver. The third straight line bend 98 is also parallel with the first straight line bend 94 and the second straight line bend 96. As best seen in FIG. 4, the second straight line bend 96 angles a portion of the longitudinal length of the louver adjacent it's second longitudinal edge 78 downwardly and the third straight line bend 98 angles a portion of the longitudinal length of the louver adjacent the first longitudinal edge 76 upwardly. This enables the plurality of louvers 52 to form a substantially continuous surface in the grill interior volume 26 when cooking in the indirect heat mode as will be explained.

Figure 9:
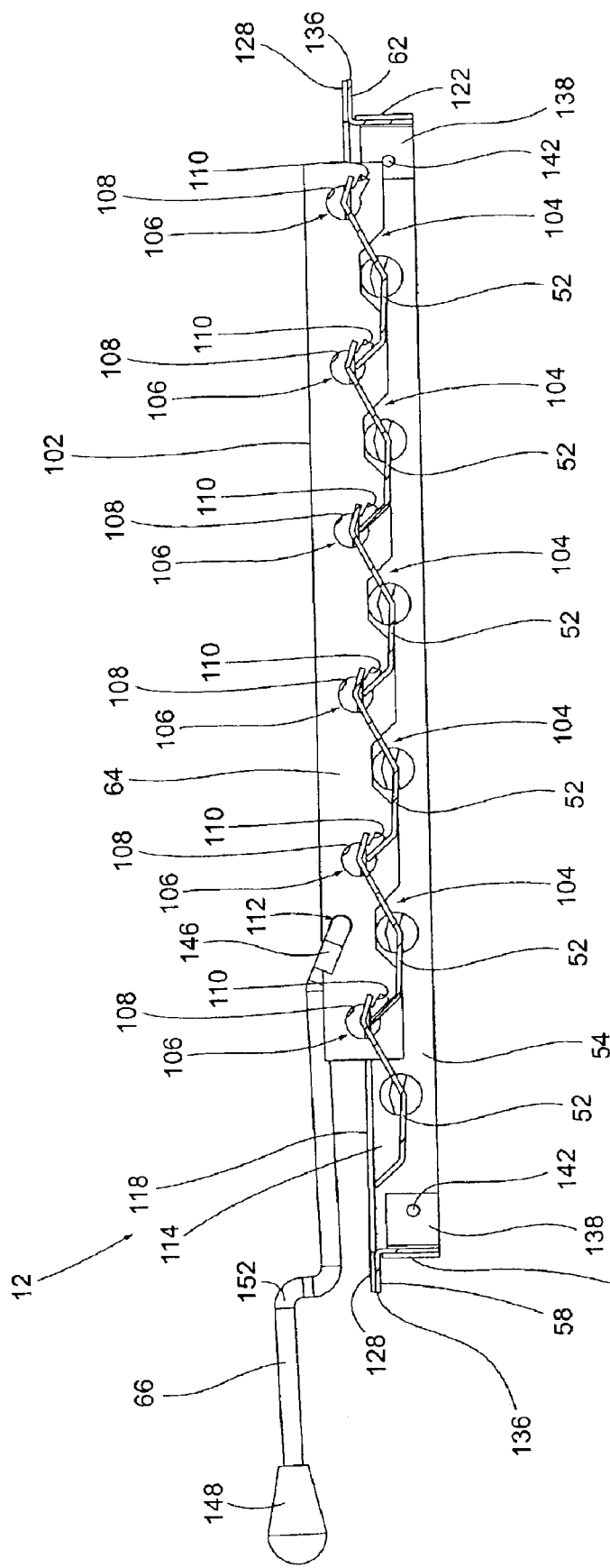
FIG. 9 is a side sectioned view of the apparatus along the line 9—9 of FIG. 8.
Figure 11:
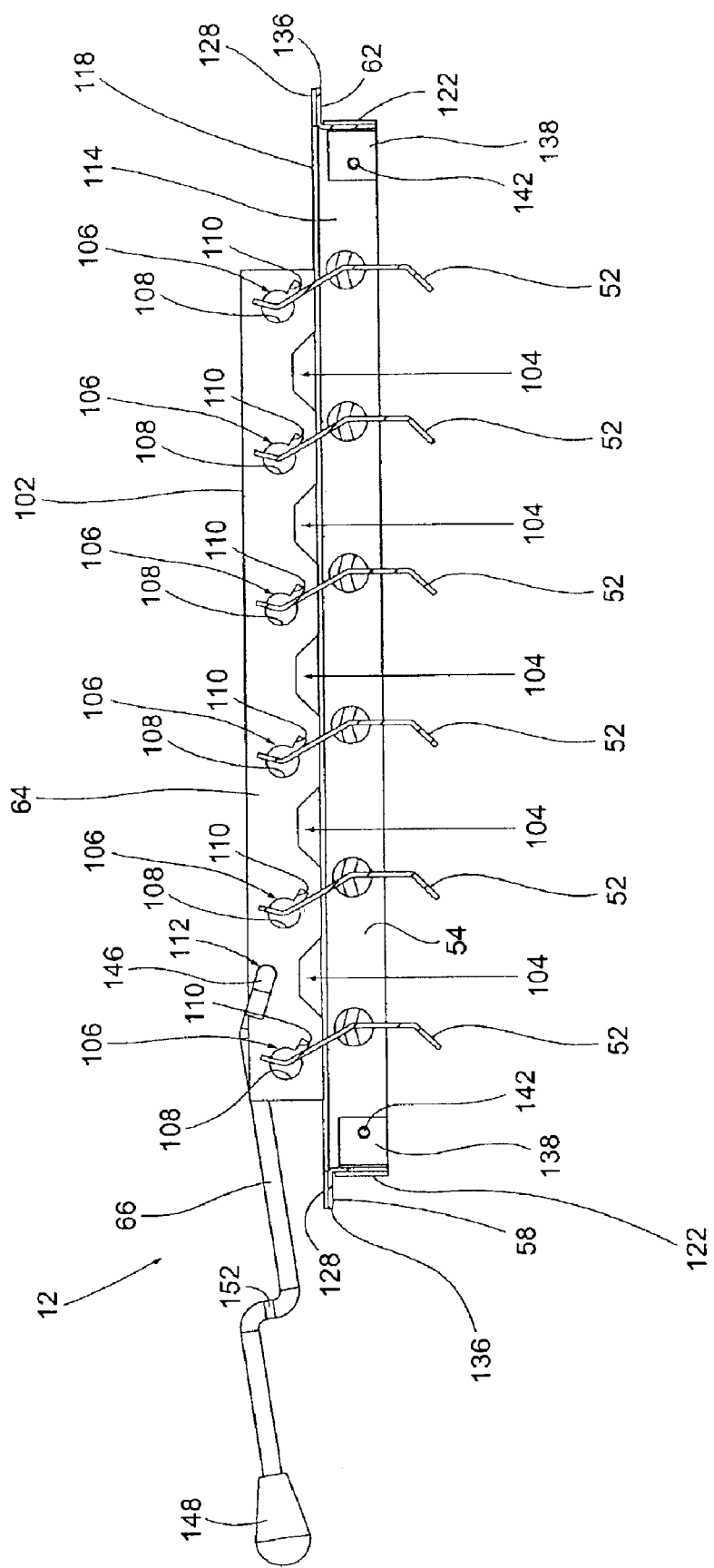
FIG. 11 is a side sectioned view of the apparatus along the line 11—11 of FIG. 10.

The actuator bar 62 can best be seen in FIGS. 3, 9 and 11. The actuator bar 64 has an elongate, generally rectangular configuration that is stamped from a thin sheet of metal, preferably stainless steel. The actuator bar 64 is formed with a straight top edge 102 and a bottom edge having a plurality of spatially arranged notches 104 along the lateral length of the bottom edge. The actuator bar is also formed with a plurality of holes 106 through the actuator bar equal to the number of louvers 52. Each of the holes 106 has a circular portion 108 and a slot portion 110 that projects radially outwardly from the circular portion. The plurality of holes 106 and the plurality of notches 104 of the actuator bar 64 are positioned relative to each other to enable the first pivot axles 82 of the louvers 52 to be positioned in the notches 104 in the bottom edge of the actuator bar when inserting the actuator tabs 86 of the louvers in the actuator bar holes 106. Each of the louver actuator tab head portions 92 is larger than the diameter of the circular position 108 of each actuator bar hole 106. Therefore, each louver 52 must be maneuvered relative to the actuator bar 64 so that the louver actuator tab head portion 92 passes through the slot portion 110 and the circular portion 108 of the actuator bar hole 106 when assembling the actuator bar 64 to the plurality of louvers 52. The actuator bar notches 104 receive the first pivot axles 82 of the louvers 52 as the actuator tabs 86 of the louvers are assembled in the actuator bar holes 106. Once each louver 52 is assembled to the actuator bar 64, the neck portion 88 of the louver actuator tab 86 is positioned in the circular portion 108 of the actuator bar hole 106 and the actuator tab head portion 92 prevents the actuator tab from being separated from the actuator bar hole. A rod hole 112 is provided through the actuator bar adjacent the bar top edge 102. The rod hole receives the actuator rod 66 when assembling the actuator rod 66 to the actuator bar 64.

The actuator rod 66 has a length with a hook 146 formed in a first end of the rod and a knob or handle 148 attached to a second end of the rod. The rod is formed with a bend 152 intermediate its first and second ends that forms an angled offset 152 in the rod.

The plurality of louvers 52 are supported for pivoting movement about their first 82 and second 84 pivot axles by a generally rectangular frame constructed from the left and right end supports 54, 56 and the front and rear supports 58, 62. The left end support 54 is shown in FIGS. 6 and 7 and only its construction will be described, with it being understood that the construction of the right end support 56 is the same.

Figure 6:
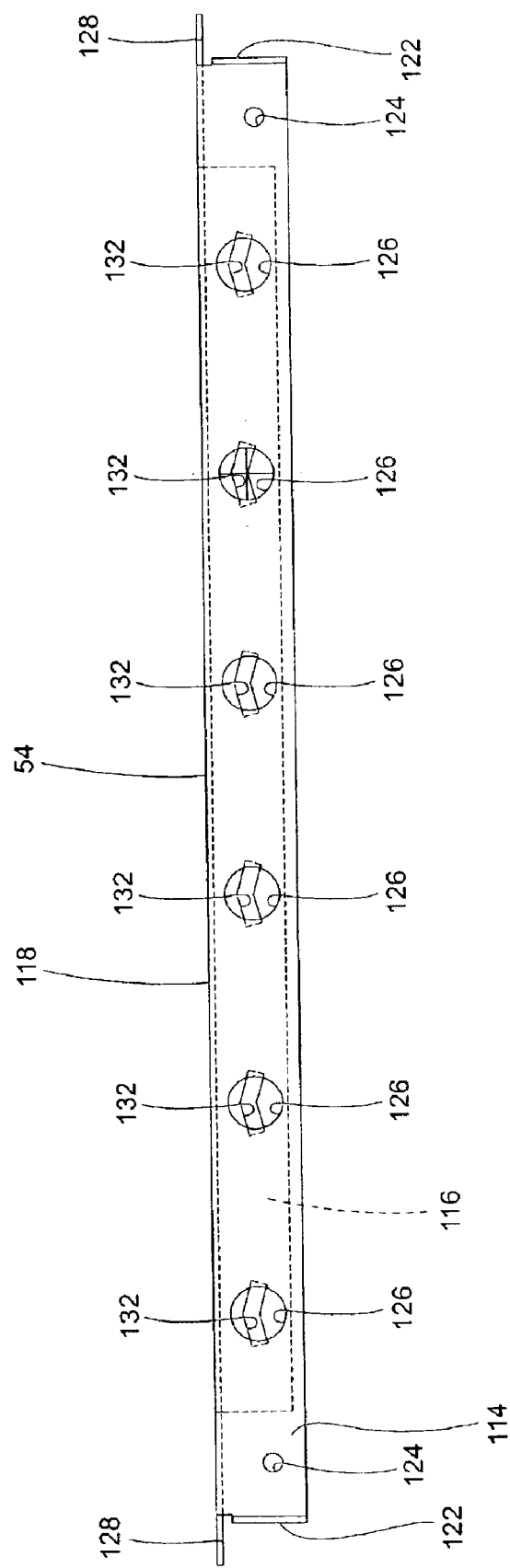
FIG. 6 is a side view of an end support of the frame of the apparatus.
Figure 7:
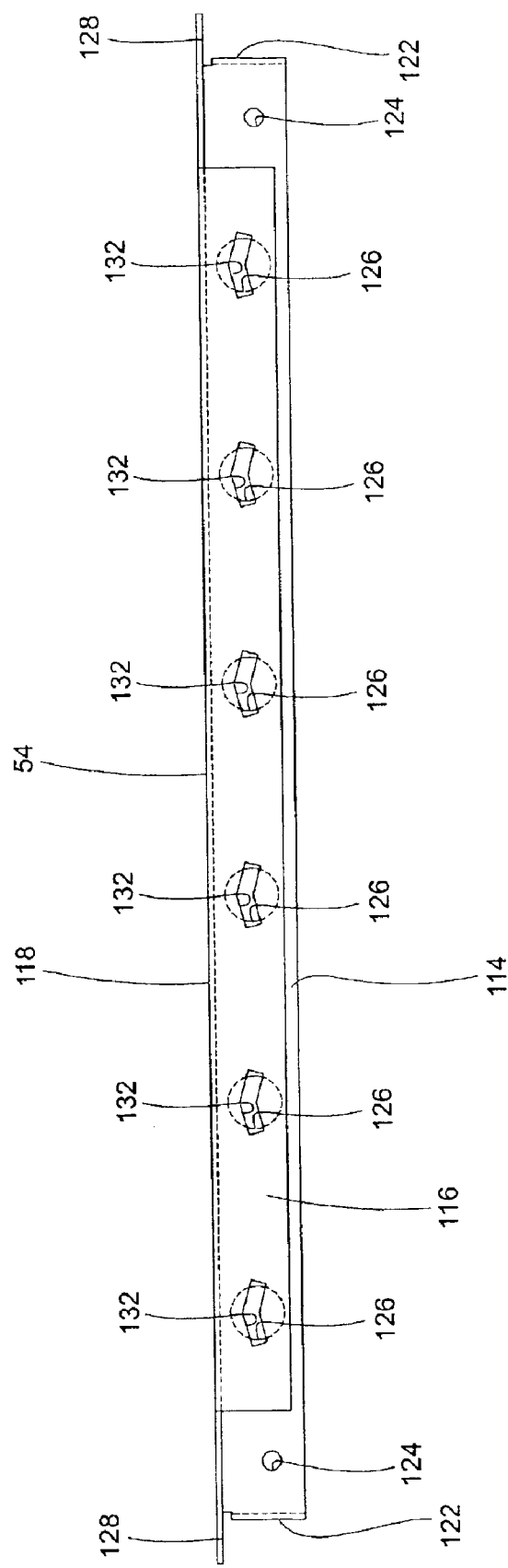
FIG. 7 is an opposite side view of the end support of FIG. 6.

As shown in FIGS. 6 and 7, the left end support 54 is constructed from an elongate, flat piece of metal, preferably stainless steel, that has been bent into a channel having an inverted U-shaped cross-section. The lateral length of the channel configuration of the first end support 54 includes an inboard wall 114 that faces toward the plurality of louvers 52, an opposite outboard wall 116 and a top wall 118. The end support inboard wall 114 has a pair of right angle bent flanges 122 at its laterally opposite ends. Adjacent the pair of flanges 122 is a pair of fastener holes 124 at the laterally opposite ends of the inboard wall 114. The pair of flanges 122 and the fastener holes 124 are employed in constructing the frame of the apparatus, as will be explained. Between the fastener holes 124 is a plurality of larger holes 126 equal in number to the plurality of louvers 52. The larger holes 126 are support holes that have interior diameters that are slightly larger than the lateral widths of the louver pivot axles 82, 84. The peripheral edges of the support holes 126 function as the support surfaces that support the louver pivot axles 82, 84 for pivoting movement, as will be explained. The top wall 118 of the end support extends laterally along the length of the inboard wall 114. The top wall 118 has a pair of end flanges 128 that project laterally beyond the inboard wall flanges 122. The laterally end flanges 128 of the top wall are also employed in assembling the frame of the apparatus, as will be explained. The outboard wall 116 extends along the lateral length of the top wall 118 and is spaced from the inboard wall 114 by the top wall. A plurality of chevron shaped slots 132 are provided through the outboard wall 116. The number of chevron shaped slots 132 corresponds to the number of the louvers 52 of the apparatus and each slot is positioned opposite a support hole 126 in the inboard wall 114 of the end support. Each of the slots 132 is dimensioned large enough to receive one of the louver pivot axles 82, 84 through the slot.

As stated earlier, the front support 58 and rear support 62 are the same and therefore only the front support 58 will be described. The front support 58 has a longitudinal length that is slightly shorter than the length of the louvers 52 between the distal ends of the louvers' pivot axles 82, 84. The front support has a side wall 134 that faces toward the louvers and a top wall 136 bent at a right angle relative to the side wall along the longitudinal length of the front support. The front support side wall 134 has a pair of right angle flanges 138 at its longitudinally opposite ends. Each of the flanges 138 has a fastener hole 142. The flange holes 142 receive fasteners when constructing the frame of the apparatus from the front and rear supports. The front support top wall 136 extends along the longitudinal length of the front support and has a pair of flanges 144 that project from its longitudinally opposite ends beyond the flanges 138 of the side wall 134.

Figure 8:
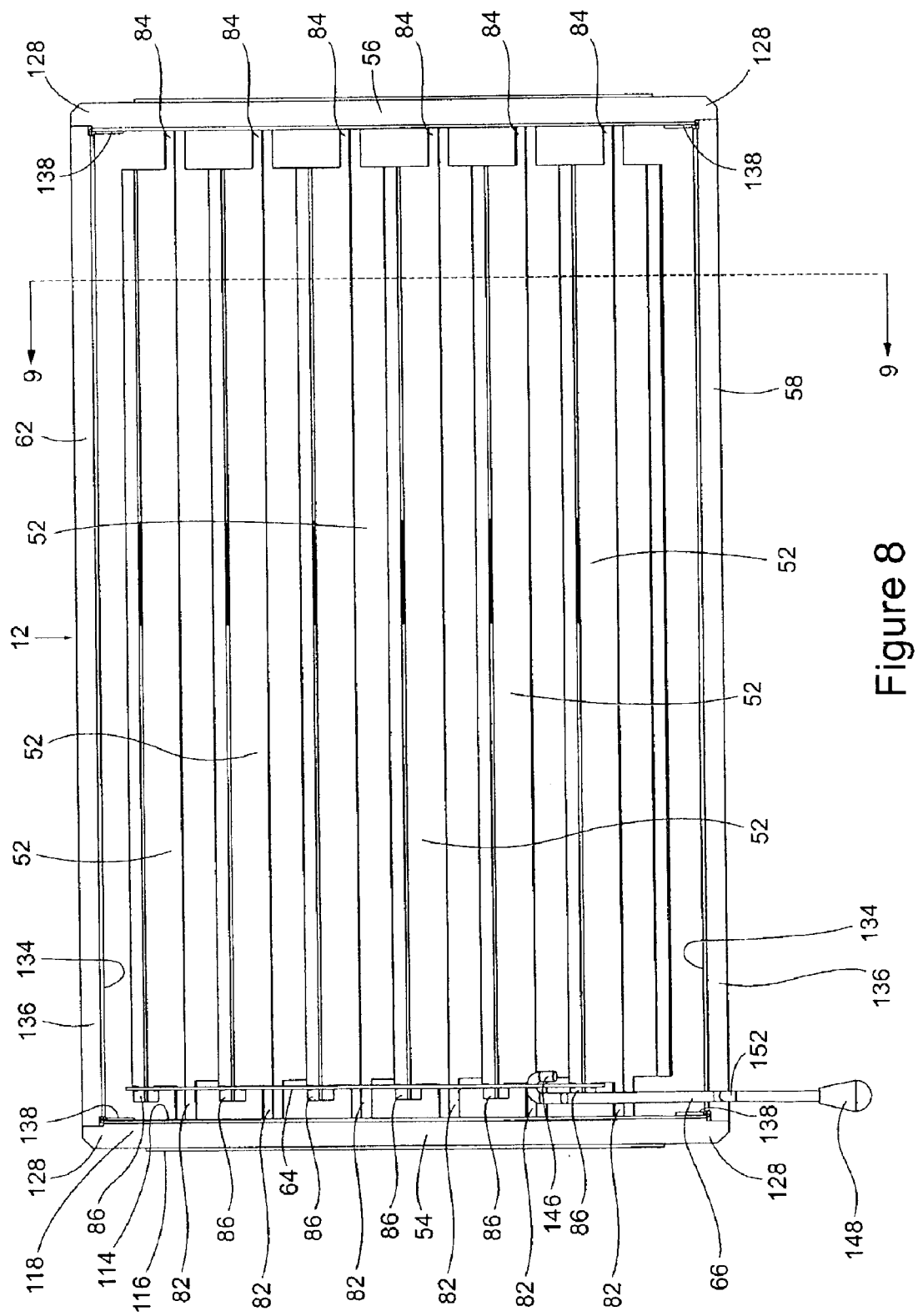
FIG. 8 is a plan view of the apparatus of the invention with the louvers positioned in their first positions.
Figure 10:
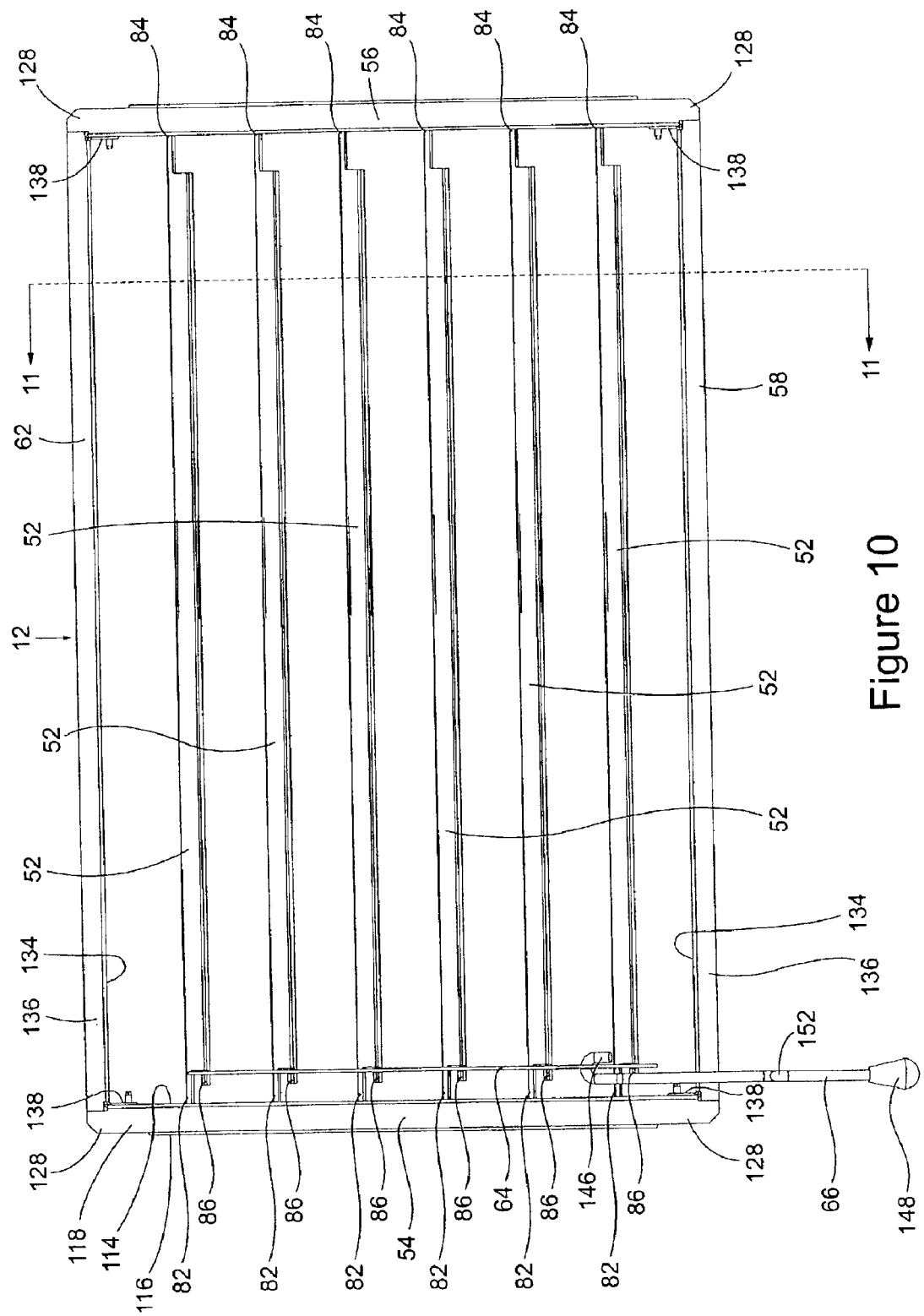
FIG. 10 is a plan view of the apparatus with the louvers in their second positions.

In assembling the apparatus 12, the frame defined by the first and second end supports 54, 56 and the front and rear supports 58, 62 is constructed as shown in FIGS. 8 and 10. The first and second end supports 54, 56 are positioned at the longitudinally opposite ends of the front and rear supports 58, 62 with the top wall flanges 128 of the end supports overlapping the top wall flanges 138 of the front and rear supports. The inboard wall flanges 122 of the first and second end supports 54, 56 extend behind the side walls 134 of the front and rear supports 58, 62. The side wall flanges 138 of the front and rear supports are positioned inside the end support inboard walls 114 with the front and rear support flange holes 142 aligned with the fastener holes 124 of the end support inboard walls. Screw threaded fasteners are inserted through the aligned fastener holes securing the left and right end supports 54, 56 and the front and rear supports 58, 62 together in the rectangular frame configuration shown in FIGS. 8 and 10.

The louvers 52 are next assembled to the frame by inserting the louver pivot axles 82, 84 into the support holes 126 of the end supports. Because the length of the louvers between the distal ends of their pivot axles 82, 84 is greater than the longitudinal spacing between the opposed inboard walls 114 of the left and right end supports 54, 56, one of the louver pivot axles, for example the second axle 84, is first inserted through a support hole 126 of the right end support 56 in an inverted orientation. This enables the pivot axle 84 to pass entirely through the right end support 56 by passing through the support hole 126 and the chevron shaped slot 132 on the opposite side of the support hole. This enables the first pivot axle 82 of the louver to be positioned inside the rectangular frame where it is aligned with the support hole 126 of the left end support 54. The pivot axle 82 is moved longitudinally into the support hole 126 of the left end support 54, causing the second pivot axle 84 of the louver to be retracted out of the chevron slot 132 of the right end support 56. With the pivot axles 82, 84 of the louver 52 now being positioned in the support holes of the left and right end supports 54, 56, the louver can be rotated to its orientation relative to the frame shown in FIG. 3. This prevents the louver pivot axles 82, 84 from entering into the chevron slots 132 of either of the end supports 54, 56 and mounts the louver 52 for pivoting movement on the support surfaces of the end support holes 126. Each of the louvers 52 are assembled to the frame in this way.

With the louvers 52 assembled into the frame, the actuator bar 64 is next assembled to the louvers. Each of the louvers 52 are pivoted so that their actuator tabs 86 align with one of the holes 106 of the actuator bar. As explained earlier, the notches 104 along the bottom edge of the actuator bar enable the actuator bar to be positioned relative to the plurality of louvers 52 so that the actuator tabs 86 of the louvers can pass through the circular portions 106 and slot portions 110 of the actuator bar holes 106. This mounts the actuator bar 62 on the louvers 52 extending laterally adjacent the first end 72 of the louvers. The actuator tab neck portions 88 are positioned in the actuator bar holes 106 and the actuator bar head portions 92 that are dimensioned larger than the diameter of the actuator bar hole circular portions 108 hold the actuator bar 64 on the first ends 72 of the louvers.

The actuator rod 66 is then assembled to the actuator bar 64 by extending the hooked first end 146 of the actuator rod through the rod hole 112 of the actuator bar 64.

The completed cooker and smoker apparatus 12 is assembled into the interior of the outdoor grill 14 in the position shown in FIGS. 1 and 2. In FIGS. 1 and 2, the cooker and smoker apparatus 12 is placed on top of an interior ledge surface of the outdoor grill 14. The interior ledge surface of the grill supports the smoker and cooker apparatus 12 in its position below the grill grate 38 and above the grill burner 28 and heat diffuser 36. In this manner of supporting the cooker and smoker apparatus 12 in the outdoor grill 14, the apparatus is easily removed for cleaning. In alternative embodiments of the cooker and smoker apparatus 12, the frame of the apparatus could be formed as an integral part of the interior of the grill or could be attached to the interior of the grill by separate fasteners.

As the cooker and smoker apparatus 12 is assembled into the interior of the grill 14, the actuator rod 66 is extended through a hole 156 in the front wall 18 of the grill. This positions the actuator rod second end with its handle 148 outside the grill where it can be easily manually gripped and the rod manipulated relative to the cooker and smoker apparatus 12.

Referring to FIGS. 1, 2 and 8–11, when it is desired to provide indirect heat from the grill gas burner 28 to food supported on the grill grate 38, the handle 148 of the apparatus actuator rod 66 is manipulated by pushing it inwardly into the grill interior. This causes the plurality of louvers 52 to pivot on the support surfaces of the end support holes 126 to first positions of the louvers relative to each other shown in FIGS. 2, 8 and 9. In this position of the louvers 52 the louvers overlap. Each louver first longitudinal edge 76 is positioned below a louver adjacent the edge and each louver second longitudinal edge 78 is positioned above a louver adjacent the edge. This forms a substantially continuous surface between the gas burner 28 and the cooking grill grate 38 of the grill. Thus, the heat of the gas burner 28 heats the food supporting on the grill grate 38 indirectly. In addition, any of the drippings of the cooking food supported on the grill grate 38 will fall downwardly onto the plurality of louvers 52. The drippings will be retained on the louvers 52 and will be burned off by the heat of the gas burner 28. This will produce a smoke from the drippings which smokes the food supported on the grill cooking grate 38 in the indirect mode of cooking.

When the direct cooking of food is desired, the actuator rod 66 is manipulated by pulling the rod handle 148 away from the grill 14. This causes the actuator bar 64 to pivot the plurality of louvers 52 on their support surfaces 126 to the second positions of the louvers shown in FIGS. 1, 10 and 11. The louvers 52 in their second positions are oriented uprightly and enable the heat of the gas burner 28 to directly heat the food supported on the grill cooking grate 38. To maintain the louvers 52 in their upright orientations, the offset 152 of the actuator rod is moved so that it engages an exterior surface of the grill front wall 18 adjacent the hole 156 in the front wall. The weight of the louvers 52 and the lateral offset of the louver pivot axles 82, 84 from the center of each louver causes the louvers to tend to move toward their first positions if not restrained. The engagement of the actuator rod offset 152 with the exterior surface of the grill front wall 18 adjacent the hole 156 in the front wall holds the louvers in their upright orientations as shown in FIG. 1. Any drippings from the food as it cooks on the grill cooking grate 38 fall between the vertically oriented louvers 52 and land on the grill heat diffuser 36 which burns off the drippings and creates smoke that enhances the flavor of the cooking food.

The cooker and smoker apparatus 12 described above provides an inexpensive to manufacture and easily assembled apparatus that provides the option of direct heat or indirect heat cooking of food in an outdoor grill while also providing smoking of the food in both modes of cooking. The simplified construction of the cooker and smoker apparatus can be easily incorporated into an outdoor grill during its manufacturing and can easily be retrofitted to an existing outdoor grill.

While the present invention has been described by reference to a specific embodiment, it should be understood that modifications and variations of the invention may be constructed without departing from the scope of the invention defined in the following claims.

What is claimed is:

1. An outdoor cooker and smoker apparatus comprising:
a plurality of louvers in the outdoor cooker and smoker apparatus, each of the louvers having opposite first and second ends and a longitudinal length between the opposite first and second ends, each of the louvers having laterally opposite first and second edges that extend longitudinally between the opposite first and second ends, each of the louvers having first and second pivot axles projecting outwardly in opposite directions from the respective louver first and second ends, the first and second axles being positioned between and being spaced from the louver first and second edges, and each louver and the first and second pivot axles of the louver being formed from a single unitary planar piece of material with the louver being planar and the first and second pivot axles being planar.

2. The apparatus of claim 1, further comprising:
the first and second pivot axles of each louver having longitudinally extending bends formed in the pivot axles.

3. The apparatus of claim 2, further comprising:
the bends formed in the first and second pivot axles of each louver giving the pivot axles a V-shaped lateral cross section.

4. The apparatus of claim 1, further comprising:
each of the louvers having a longitudinally extending bend formed in the louver with the bend extending the length of the louver.

5. The apparatus of claim 4, further comprising:
the bend formed in each of the louvers extending longitudinally through the first and second pivot axles of each of the louvers.

6. The apparatus of claim 1, further comprising:
first and second end supports adjacent the respective first and second ends of the plurality of louvers, each of the first and second end supports having a lateral length and a plurality of support surfaces spatially arranged along the lateral length, the first pivot axles of the plurality of louvers being supported for pivoting movement on the support surfaces of the first end support and the second pivot axles of the plurality of louvers being supported for pivoting movement on the support surfaces of the second end support.

7. An outdoor cooker and smoker apparatus comprising:
a plurality of louvers, each of the louvers having opposite first and second ends and a longitudinal length between the opposite first and second ends, each of the louvers having first and second pivot axles projecting outwardly in opposite directions from the respective louver first and second ends, each louver and the first and second pivot axles of the louver being formed from a single unitary planar piece of material with the louver being planar and the first and second pivot axles being planar;
first and second end supports adjacent the respective first and second ends of the plurality of louvers, each of the first and second end supports having a lateral length and a plurality of support surfaces spatially arranged along the lateral length, the first pivot axles of the plurality of louvers being supported for pivoting movement on the support surfaces of the first end support and the second pivot axles of the plurality of louvers being supported for pivoting movement on the support surfaces of the second end support; and,
the first and second end supports each having a plurality of spatially arranged holes and each of the support surfaces of the first and second end supports extend at least partially around a hole.

8. The apparatus of claim 7, further comprising:
the first and second end supports each having a plurality of elongate slots spatially arranged along the end support and each slot being longitudinally aligned with a hole.

9. An outdoor cooker and smoker apparatus comprising:
a plurality of louvers, each of the louvers having opposite first and second ends and a longitudinal length between the opposite first and second ends, each of the louvers having first and second pivot axles projecting outwardly in opposite directions from the respective louver first and second ends, each louver and the first and second pivot axles of the louver being formed from a single unitary planar piece of material with the louver being planar and the first and second pivot axles being planar; and, each of the louvers having an actuator tab projecting outwardly from the first end of the louver, each louver, the first and second pivot axles of each louver and the actuator tab of each louver being formed from a single unitary planar piece of material with the tabs being planar.

10. The apparatus of claim 9, further comprising:
the actuator tab of each louver having a longitudinally extending bend formed in the tab.

11. The apparatus of claim 10, further comprising:
an actuator bar adjacent the first ends of the plurality of louvers, the actuator bar having a lateral length and a plurality of holes in the actuator bar that are spatially arrange along the length of the bar; and
each actuator tab being inserted into one of the actuator bar holes.

12. The apparatus of claim 11, further comprising:
an actuator rod having a length with opposite first and second ends, the rod second end being connected to the actuator bar and the rod first end having a handle for manually manipulating the rod to cause the actuator bar to move laterally relative to the plurality of louvers and pivot the louvers.

13. The apparatus of claim 11, further comprising:
a front support and a back support positioned on laterally opposite sides of the plurality of louvers and extending along the longitudinal lengths of the plurality of louvers, the front and back supports being connected to the first and second end supports forming a supporting frame around the plurality of louvers.

14. An outdoor cooker and smoker apparatus comprising:
a plurality of louvers, each of the louvers having a longitudinal length with opposite first and second ends, each of the louvers having first and second pivot axles projecting longitudinally outwardly in opposite directions from the respective louver first and second ends, each of the louvers having an actuator tab projecting longitudinally outwardly from the louver first end adjacent the first pivot axle, and each louver and the actuator tab of the louver being formed from a single unitary piece of material with the louver being planar.

15. The apparatus of claim 14, further compromising:
the actuator tab of each louver having a longitudinally extending bend formed in the actuator tab.

16. The apparatus of claim 15, further comprising:
the bend in each actuator tab extending longitudinally across the length of each louver.

17. The apparatus of claim 14, further comprising:
an actuator bar adjacent the first ends of each of the louvers, the actuator bar having a lateral length and a plurality of holes in the actuator bar that are spatially arranged along the length of the actuator bar; and each actuator tab being inserted into a hole of the actuator bar.

18. The apparatus of claim 17, further comprising:
each actuator hole having a circular portion with an interior diameter dimension and a slot portion that extends outwardly from the circular portion and enables the actuator tab to be inserted through the circular portion and the slot portion into the actuator hole.

19. The apparatus of claim 18, further comprising:

each actuator tab having a neck that projects outwardly from the louver first end and a head on the neck, the head having a lateral width dimension that is larger than a lateral width dimension of the neck and larger than the interior diameter dimension of the actuator hole circular portion.

20. The apparatus of claim 14, further comprising:

first and second end supports adjacent the respective first and second ends of the plurality of louvers, the first and second end supports each having a lateral length and a plurality of support surfaces spatially arranged along the lateral length, the first pivot axles of the plurality of louvers being supported for pivoting movement by the support surfaces of the first end support and the second pivot axles of the plurality of louvers being supported for pivoting movement by the support surfaces of the second end support.

21. The apparatus of claim 20, further comprising:

a front support and a back support positioned on laterally opposite sides of the plurality of louvers and extending along the longitudinal lengths of the plurality of louvers, the front and back supports being connected to the first and second end supports forming a supporting frame around the plurality of louvers.

22. An outdoor cooker and smoker apparatus comprising:

a plurality of louvers, each of the louvers having a longitudinal length with opposite first and second ends, each of the louvers having first and second pivot axles projecting longitudinally outwardly in opposite directions from the respective louver first and second ends, each of the louvers having an actuator tab projecting longitudinally outwardly from the louver first end adjacent the first pivot axle;

an actuator bar adjacent the first ends of each of the louvers, the actuator bar having a lateral length and being operatively connected to each of the louver actuator tabs to cause pivoting movement of the plurality of louvers between first positions where the plurality of louvers are oriented horizontally and second positions where the plurality of louvers are oriented vertically;

an actuator rod having a length with opposite first and second ends, the actuator rod second end being connected to the actuator bar and the actuator rod first end having a handle to manually manipulate the actuator rod to cause the actuator bar to move laterally relative to the plurality of louvers and move the plurality of louvers between the first and second positions of the louvers, the actuator rod having a bend intermediate the first and second ends of the actuator rod forming an offset in the actuator rod at a position on the actuator rod where, when the plurality of louvers, the actuator bar and the actuator rod are positioned inside a grill with the actuator rod extend through an opening in the grill, the actuator rod offset engages with the grill adjacent the opening in the grill when the plurality of louvers are in the second positions, and the actuator rod offset is positioned, inside the grill and is displaced from the opening in the grill when the plurality of louvers are in the first positions.

23. The apparatus of claim 22, further comprising:

first and second end supports adjacent the respective first and second ends of the plurality of louvers, the first and second end supports each having a lateral length and a plurality of support surfaces spatially arranged along the lateral length, the first pivot axles of the plurality of louvers being supported for pivoting movement by the support surfaces of the first end support and the second pivot axles of the plurality of louvers being supported for pivoting movement by the support surfaces of the second end support.

24. The apparatus of claim 23, further comprising:

a front support and a back support positioned on laterally opposite sides of the plurality of louvers and extending along the longitudinal lengths of the plurality of louvers, the front and back supports being connected to the first and second end supports forming a supporting frame around the plurality of louvers.

25. The apparatus of claim 24, further comprising:

the supporting frame being removably insertable inside the grill.

* * * * *